Aug. 6, 1940.    M. ROBISON    2,210,600
FEATHER CLEANER AND FLUFFER
Filed Oct. 20, 1939    2 Sheets-Sheet 1
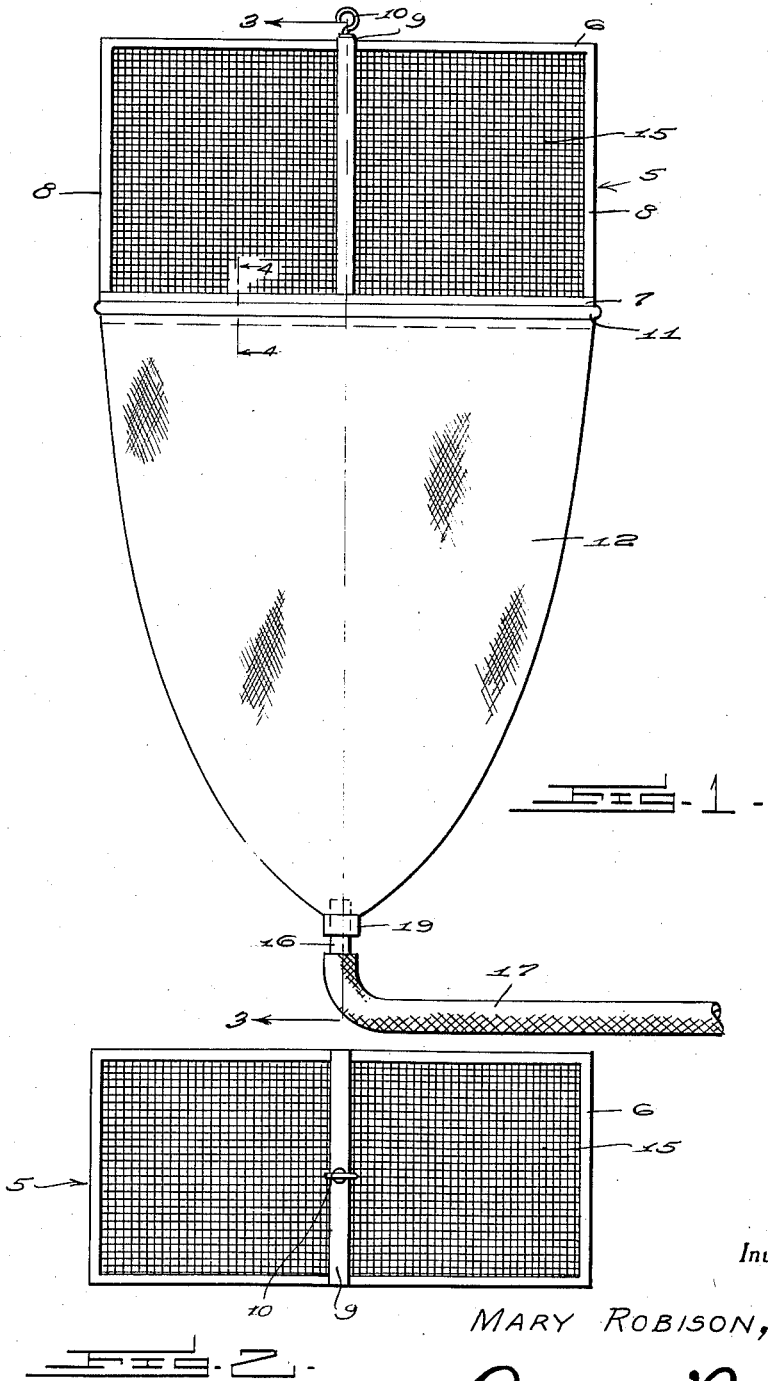
Inventor
MARY ROBISON,
By Clarence A. O'Brien
and Hyman Berman
Attorneys Aug. 6, 1940.   M. ROBISON   2,210,600
FEATHER CLEANER AND FLUFFER
Filed Oct. 20, 1939   2 Sheets-Sheet 2
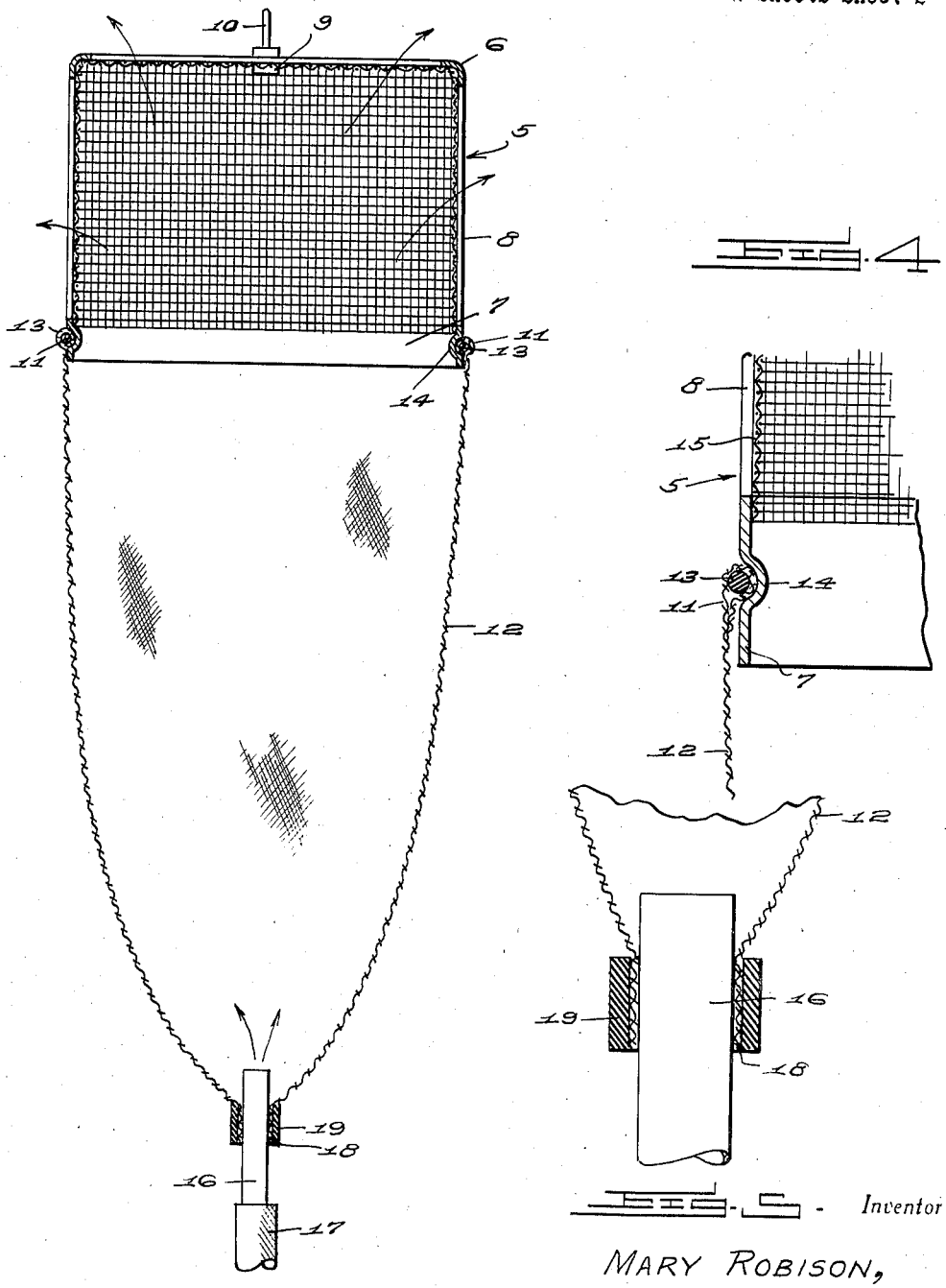
Inventor
MARY ROBISON,
By Clarence A. O'Brien
and Hyman Berman
Attorneys Patented Aug. 6, 1940

2,210,600

UNITED STATES PATENT OFFICE 2,210,600

FEATHER CLEANER AND FLUFFER

Mary Robison, Clarksburg, W. Va.

Application October 20, 1939, Serial No. 300,491

8 Claims. (Cl. 19—66)

This invention appertains to new and useful improvements in means for cleaning and fluffing feathers in a convenient and efficient manner.

An important object of the invention is to provide an inexpensive and highly efficient feather cleaner and fluffer which can be manufactured in all sizes such as for domestic use or commercial use.

Other objects and advantages of the invention will become apparent to the reader of the following specification.

In the drawings:

Figure 1 represents a side elevational view of the device.

Figure 2 is a top plan view.

Figure 3 is a vertical sectional view taken substantially on a line 3—3 of Figure 1.

Figure 4 is a fragmentary enlarged detailed sectional view taken substantially on a line 4—4 of Figure 1.

Figure 5 is a fragmentary enlarged detailed sectional view through the lower portion of the bag.

Referring to the drawings wherein like numerals designate like parts, it can be seen that this device consists of a cage generally referred to by numeral 5 through which dirt and other debris can be blown from the feathers during the cleaning and fluffing operation.

This cage consists of the upper rectangular frame 6 and the lower rectangular frame 7, the corners of these frames being connected by corner posts 8. A strip 9 extends from the intermediate portion of one side member of the lower frame 7 upwardly and over the upper frame 6, back down the other side of the cage 5 to connect to the intermediate portion of the opposite side member of the lower frame 7, and this strip 9 carries a hanger hook 10 at its uppermost portion.

The lower frame member 7 is formed with a groove extending around its entire perimeter for receiving the upper hem portion 11 of the bag 12. In the hem 11 is the elastic band 13 which can be stretched over the frame 7 and released to reseat into the said groove of the frame 7 which is identified by numeral 14.

The cage 5 has side and top walls of mesh 15, this mesh preferably being fine gauge wire.

The lower portion of the bag 12 is constricted and receives the upper portion of the air pressure nozzle 16 which projects from the air pressure hose 17 connected to a suitable machine for producing air under pressure.

The constricted portion 18 of the bag 12 is held firmly against the nozzle 16 by the elastic band 19.

Feathers to be cleaned are placed in the bag 12 after the cage 15 has been removed, and subsequently the cage and bag are connected together to assume the relationship shown in Figure 3. Air under pressure is now delivered to the bag 12 which blows the feathers upwardly toward and into the cage 5 with the result that dirt and other foreign matter is blown away from the feathers and out through the mesh side walls of the cage 5, while at the same time the feathers are fluffed. After the feathers have been thus cleaned and fluffed, the bag can be removed from the cage 5 and the feathers taken out.

While the foregoing specification sets forth the invention in specific terms, it is to be understood that numerous changes in the shape, size and materials may be resorted to without departing from the spirit and scope of the invention as claimed hereinafter.

What is claimed as new is:

1. A feather cleaner and fluffer comprising a perforate cage and a removable feather-containing bag depending therefrom and having an air inlet, said cage being provided with hanger means.

2. A feather cleaner and fluffer comprising a perforate cage and removable feather-containing bag depending therefrom and having an air inlet said cage including a lower frame having a groove at its perimeter, and an elastic member at the upper end of the bag for engaging into the said groove.

3. A feather cleaner and fluffer comprising a perforate cage and a removable feather-containing bag depending therefrom and having an air inlet, an air inlet tube for disposition into the lower portion of the bag and clamping means between the bag and the tube.

4. A feather cleaner and fluffer comprising a cage consisting of a frame provided with perforated top and side walls, suspension means at the top of the cage, the lower portion of the cage frame being formed with a groove, a removable feather containing bag depending from the lower portion of the cage frame and having an air inlet and detent means for holding a portion of the bag at its upper edge disposed into the groove to maintain the bag attached to the cage.

5. An apparatus of the character described comprising a perforate cage and a removable feather containing bag depending therefrom and having an air inlet, an air inlet tube disposed into the lower portion of the bag, and an elastic band adapted to clamp that portion of the bag through which the air inlet tube extends snugly against the said inlet tube.

6. A material treating apparatus comprising a perforate cage having suspension means at the top thereof, and a material containing bag provided with an air inlet at its lower end and detachable connecting means between its upper end and the lower portion of the cage.

7. A material treating apparatus comprising a perforate cage having suspension means at the top thereof, and a material containing bag provided with an air inlet at its lower end and detachable connecting means between its upper end and the lower portion of the cage, said bag having a narrow depending neck portion at the air inlet and an air admission tube extending through the neck.

8. A material treating apparatus comprising a perforate cage having suspension means at the top thereof, and a material containing bag provided with an air inlet at its lower end and detachable connecting means between its upper end and the lower portion of the cage, said bag having a narrow depending neck portion at the air inlet and an air admission tube extending through the neck, and a clamp element circumscribing the neck and adapted to clamp the neck against the tube.

MARY ROBISON.